United States Patent [19]
Marino

[11] 4,113,199
[45] Sep. 12, 1978

[54] TAPE REEL HOLDER

[76] Inventor: Angelo Marino, 590 Randolph Rd., Middletown, Conn. 06457

[21] Appl. No.: 805,587

[22] Filed: Jun. 10, 1977

[51] Int. Cl.² ............................................. B65H 17/52
[52] U.S. Cl. ........................................ 242/106; 33/138
[58] Field of Search ................. 242/106, 107, 84.8, 242/107.2; 33/137, 138

[56] References Cited
U.S. PATENT DOCUMENTS

| 1,422,954 | 7/1922 | Frazer | 242/106 X |
| 2,934,283 | 4/1960 | Astore | 242/84.8 |
| 3,036,791 | 5/1962 | Siggelkow | 242/107 R |

*Primary Examiner*—Edward J. McCarthy
*Attorney, Agent, or Firm*—Alan E. Steele

[57] ABSTRACT

A tape reel holder, made from a single piece of metal to hold a tape reel straight and taut so as to allow one man to lay out measurements over a great length without the necessity of a helper to hold the tape reel securely.

6 Claims, 3 Drawing Figures

TAPE REEL HOLDER

The present invention relates to a device used with flexible metal measuring tapes. Heretofore when laying out intermediate points over a distance exceeding 25 feet, the tape reel does not have a locking means and the measuring tape has to be affixed at one end, a man has to hold the tape reel taut and straight at the other end, while another man marks off the intermediate distances measured by the tape. The present invention relates to a device which holds the tape reel straight and taut without the need for any person to hold it secure.

The object of this invention is the production of a tape reel holder which holds the tape reel and tape taut in relation to the object to be measured whereby only one person is required to set up the tape and make the measurements.

Another object of this invention is to provide a tape reel holding device which is simple in construction and can be stamped and formed from a single piece of sheet metal.

Other objects and advantages will become apparent as this disclosure proceeds.

In the accompanying drawings, hereby made a part hereof:

Figure 1:
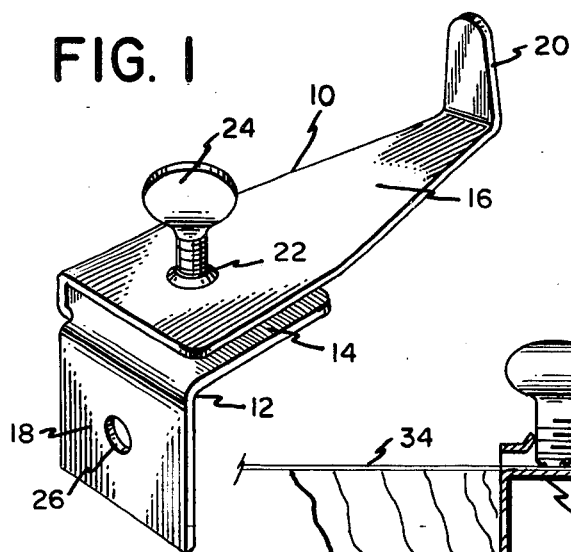
FIG. 1 is a perspective view of the device.

Referring to FIG. 1, it will be seen that the device consists of a body 10 stamped from a single piece of sheet metal. Bent under body 10 is L shaped portion 12. The horizontal side 14 of portion 12 is parallel to the straight upper side 16 of body 10. The vertical side 18 of portion 12 is bent at a right angle to side 14 and is flush with the end of upper side 16, see FIG. 3. The tail end portion of upper side 16 is bent up at acute angle to form a tape reel holder lip 20. A threaded hold 22 is formed in upper portion to receive a set screw 24. A plain hole 26 is formed in vertical side 18 and is optional as will be seen later.

Figure 3:
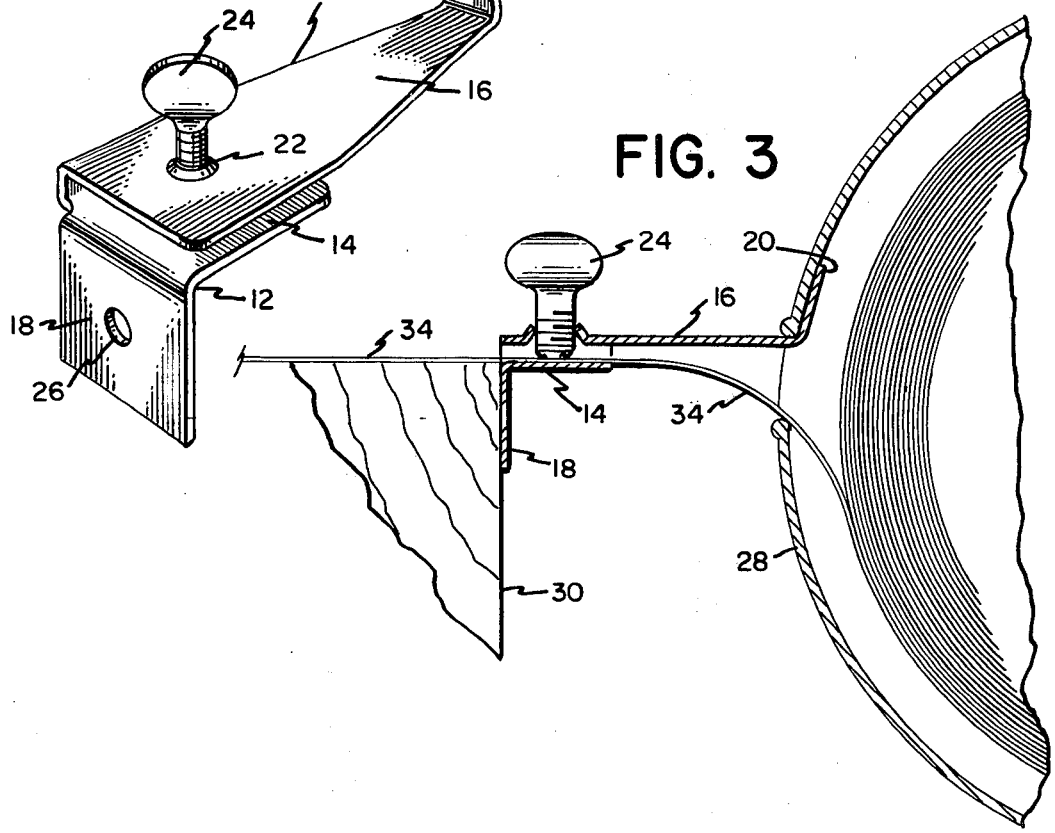
FIG. 3 is a sectional view through the device, tape reel and a portion of the box sill shown in FIG. 2.
Figure 2:
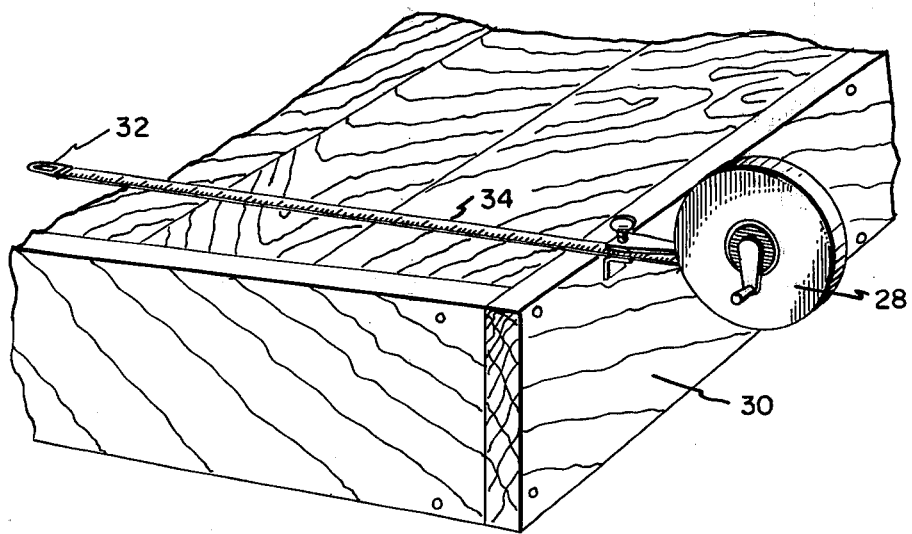
FIG. 2 is a perspective view of a tape reel and the device being utilized in laying out a box sill.

The use and operation of the device is shown in FIG. 2 and FIG. 3. Referring to FIG. 2, the body 10 is shown holding a tape reel 28 in laying out measurements on a box sill 30. The other end of the tape 34 is held at the opposite end of the sill, not shown, by slipping the ring 32 around a nail or protruding item, not shown. After the ring 32 of tape 34 is held at one end, the tape 34 is stretched across the box sill 30 by one man dispensing it from reel 28. When the tape 34 reaches the end of box sill 30, as shown in FIG. 2, lip 20 of body 10 is slipped into the dispensing opening of tape reel 28 as shown in FIG. 3. Vertical side 18 is then placed flush against the end of box sill 30 in such a manner so that tape 34 remains flat and straight in relation to the top of box sill 30, and to the top of horizontal side 14 on body 10. Note that horizontal side 14 and upper side 16 form a slot for the tape 34 to pass through. Set screw 24 is then tightened against tape 34 to hold it securely against horizontal side 14. Tape reel 28 is hooked on lip 20 of body 10 and does not require any other manual support. As the tape reel 28 is hooked on lip 20, it causes a clockwise moment about vertical side 18. However, since side 18 is flush against the end of box sill 30, it cannot rotate and is urged more against box sill 30 by the moment. Therefore body 10 and tape reel 28 attached to it will be held in place without the need of any fastening or holding device. The one man is now free to lay out and measure the box sill 30, and when completed he removes the tape 28 reel and frees the other end of tape 34 without the need of a helper.

There may be times, such as laying out a vertical structure, where the moment effect described herein will not be operative to hold the device in place. In such circumstances a hole 26 may be used to hold the body by means of passing a nail through the hole into the top of the vertical structure, such as a door.

This invention is capable of numerous forms and various applications without departing from the essential features herein set forth. For example the body may be made of plastic or any other rigid formable material. It is therefore intended that the embodiments described herein shall be deemed merely illustrative and not restrictive and that the patent shall cover all patentable novelty herein set forth; reference being had to the following claims rather than to specific showings and description herein, to indicate the scope of this invention.

I claim:

1. A tape reel holder having a body and means for the connection of a tape reel to said body, said body comprising a horizontal surface having one end thereof bent upwardly at an angle to form a lip, a member parallel to and bent under the other end of said horizontal surface, a vertical member bent downwardly from said parallel member, said vertical member located at one end of said body and said lip located at the other end of said body, whereby a tape reel may be hooked onto said lip and a tape may be introduced edgewise between a space formed by said horizontal surface and said parallel member.

2. A tape reel holder as defined in claim 1 wherein said horizontal surface has a threaded hole positioned above said parallel member.

3. A tape reel holder as defined in claim 2, where a set screw engages said threaded hole to abut against said tape in the space between said horizontal and parallel members.

4. A tape reel holder as defined in claim 1 wherein said body is a unitary structure formed from a single piece of material.

5. A tape reel holder as defined in claim 4 wherein said single piece of material is a metal stamping.

6. In the linear measurement of the surface of an article a tape reel holder having a body, an arm extending from one end of said body to support a reel of measuring tape wherein the end of the tape has been fastened to the article and extends across the length of said body, means for securing the tape to a point intermediate the ends of said body, the opposite end of said body having a portion abutting and frictionally engaging the outer edge of the article, which edge is substantially perpendicular to the surface being measured.

* * * * *